United States Patent [19]

Young

[11] Patent Number: 4,776,615
[45] Date of Patent: Oct. 11, 1988

[54] VAPOR RECOVERY APPARATUS WITH SWIVELED NOZZLE

[75] Inventor: Randall K. Young, San Diego, Calif.

[73] Assignee: Pomeco Corporation, Long Beach, Calif.

[21] Appl. No.: 460,192

[22] Filed: Jan. 24, 1983

[51] Int. Cl.[4] .................................... F16L 39/04
[52] U.S. Cl. ............................ 285/136; 285/137.1; 285/168; 285/261; 141/290
[58] Field of Search ............... 285/261, 263, 282, 134, 285/137.1, 136, 168, DIG. 7; 141/206–229, 290, 392; 222/74

[56] References Cited

U.S. PATENT DOCUMENTS

| | | | |
|---|---|---|---|
| 1,995,109 | 3/1935 | Smittle | 285/DIG. 7 |
| 2,564,938 | 8/1951 | Warren | 285/261 X |
| 3,450,421 | 6/1969 | Harwell | 285/267 X |
| 3,712,645 | 1/1973 | Herter | 285/261 X |
| 4,090,539 | 5/1978 | Kurpp | 285/134 X |
| 4,239,262 | 12/1980 | Krupp et al. | 285/282 |
| 4,260,183 | 4/1981 | Krupp | 285/134 |

FOREIGN PATENT DOCUMENTS 1226904  8/1960  France ........................ 285/261

OTHER PUBLICATIONS

Pump Hose Swivels (Wheaton) 1 page, Exhibit A.
OPW Hose Swivels (Dover Corp.) 2 pages, Exhibit B and D.
Weil Service Products Corp., 1 page Exhibit C.
Pomeco Corporation (1 page) Exhibit E.

*Primary Examiner*—Dave W. Arola
*Attorney, Agent, or Firm*—Phillips, Moore, Lempio & Finley

[57] ABSTRACT

A vapor recovery nozzle is connected to a fuel hose and to a vapor recovery hose. A ball and socket connection attaches each hose to the nozzle to permit the nozzle to swivel.

22 Claims, 2 Drawing Sheets

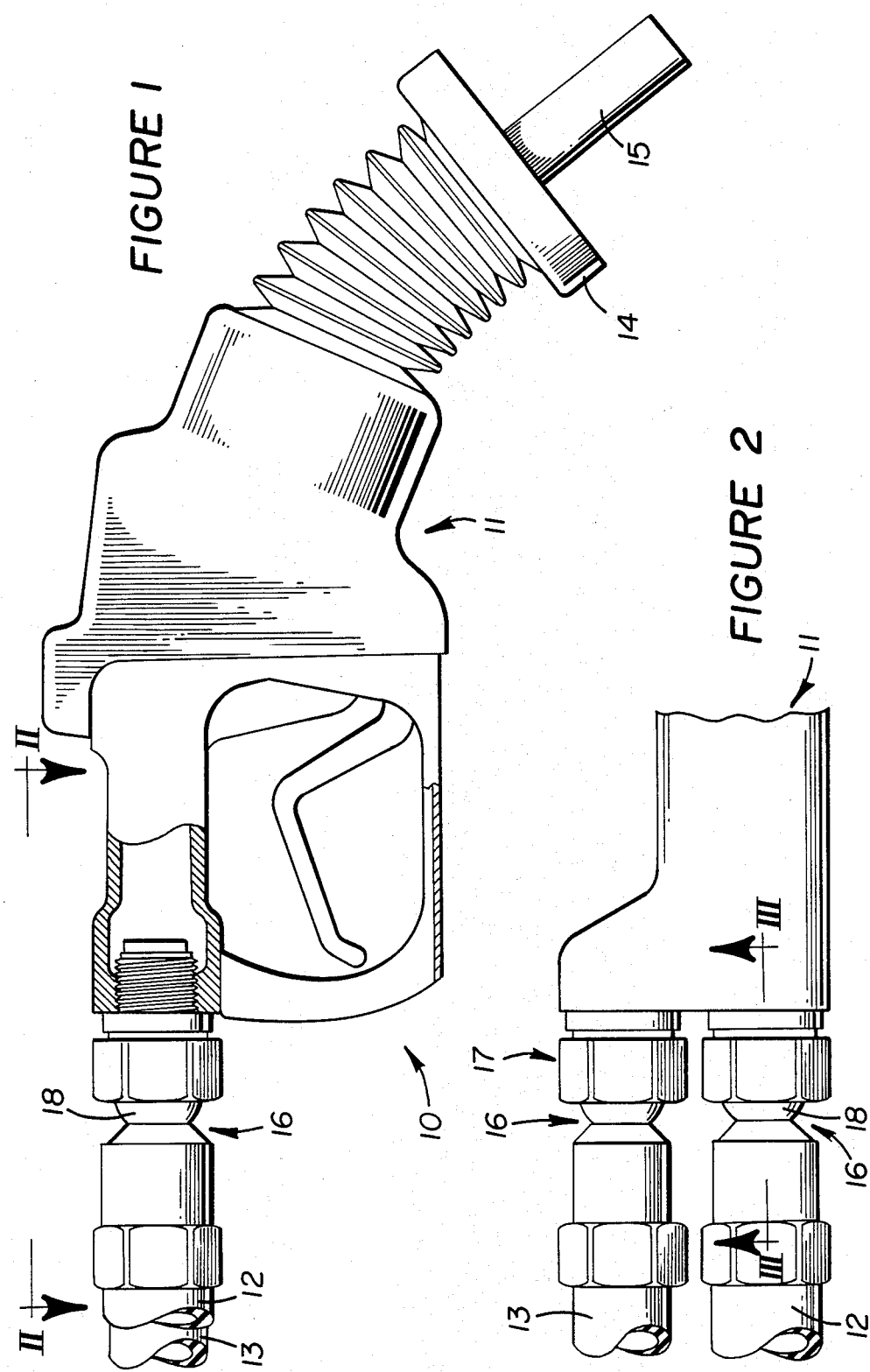

VAPOR RECOVERY APPARATUS WITH SWIVELED NOZZLE

DESCRIPTION

1. Technical Field

This invention relates generally to a vapor recovery apparatus and more particularly to a swivel joint for attaching a fuel dispensing nozzle to a fuel hose.

2. Background Art

Conventional vapor recovery apparatus for dispensing fuel into the tanks of automobiles and the like include fuel dispensing and vapor recovery hoses connected to a fuel dispensing nozzle. The nozzle is difficult to use due to the dual hose connection and because the nozzle proper is more bulky and weighty than a standard nozzle having a single hose connected thereto. It is particularly desirable, in respect to certain types of vapor recovery systems, to provide the user of a vapor recovery type nozzle with the ability to properly engage an elastomeric seal thereof with a fill spout of a fuel tank to ensure that fuel vapors from the tank do not escape into ambient. In addition to difficulty of use, insertion of the nozzle into the fill spout of the fuel tank will unduly subject the hoses to torsional and bending stresses, inducing premature failure of one or both of the hoses.

Although swivel arrangements have been proposed to interconnect the nozzle with the fuel dispensing and vapor recovery hoses, these arrangements are bulky and weighty. In addition, the connection point between the fuel hose and the nozzle is positioned at a substantial distance from the nozzle's hand grip to further increase the difficulty of use. A typical swivel arrangement of this type provides a first swivel movement in a plane parallel to an axis of the fuel hose and an independent second swivel movement perpendicular to such axis. Since the two swivels are positioned closely adjacent to each other, as dictated by the location of the two attachment openings for the hoses at the rear of the nozzle, swivel movement of the nozzle is limited to either horizontal or vertical movement.

Another disadvantage of this conventional type of swivel arrangement is that vapor flow is restricted in the vapor hose from the nozzle. In particular, the standard hose swivel requires a change of 90° in the direction of vapor flow, which tends to increase the back pressure of the vapor recovery system. Although the diameter of the vapor passages can be enlarged to at least partially overcome this problem, such a solution adds to the bulk and weight of the nozzle assembly and to the manufacturing cost thereof.

DISCLOSURE OF INVENTION

This invention overcomes the above, briefly-described problems by providing a fuel dispensing apparatus having universal coupling means for attaching a fuel dispensing nozzle to a fuel hose for permitting the nozzle to swivel about a pivot point within an imaginary conical plane having its vertex at the pivot point.

In the preferred embodiment of this invention, the universal coupling means is employed in a fuel dispensing apparatus of the vapor recovery type wherein a fuel hose and vapor recovery hose are each attached to a dispensing nozzle. The universal coupling means can be utilized to attach both the fuel and vapor recovery hoses to the nozzle. The coupling means can be also utilized to attach a single fuel hose to a non-vapor recovery nozzle.

BRIEF DESCRIPTION OF THE DRAWINGS

Other objects and advantages of this invention will become apparent from the following description and accompanying drawings wherein:

FIG. 1 is a partially sectioned side elevational view of a vapor recovery apparatus embodiment of the present invention, including a fuel dispensing nozzle having a fuel hose and a vapor recovery hose attached thereto;

FIG. 2 is a partial top plan view, taken generally in the direction of arrows II—II in FIG. 1, illustrating attachment of the fuel and vapor recovery hoses to the nozzle.

BEST MODE OF CARRYING OUT THE INVENTION

Figure 3:
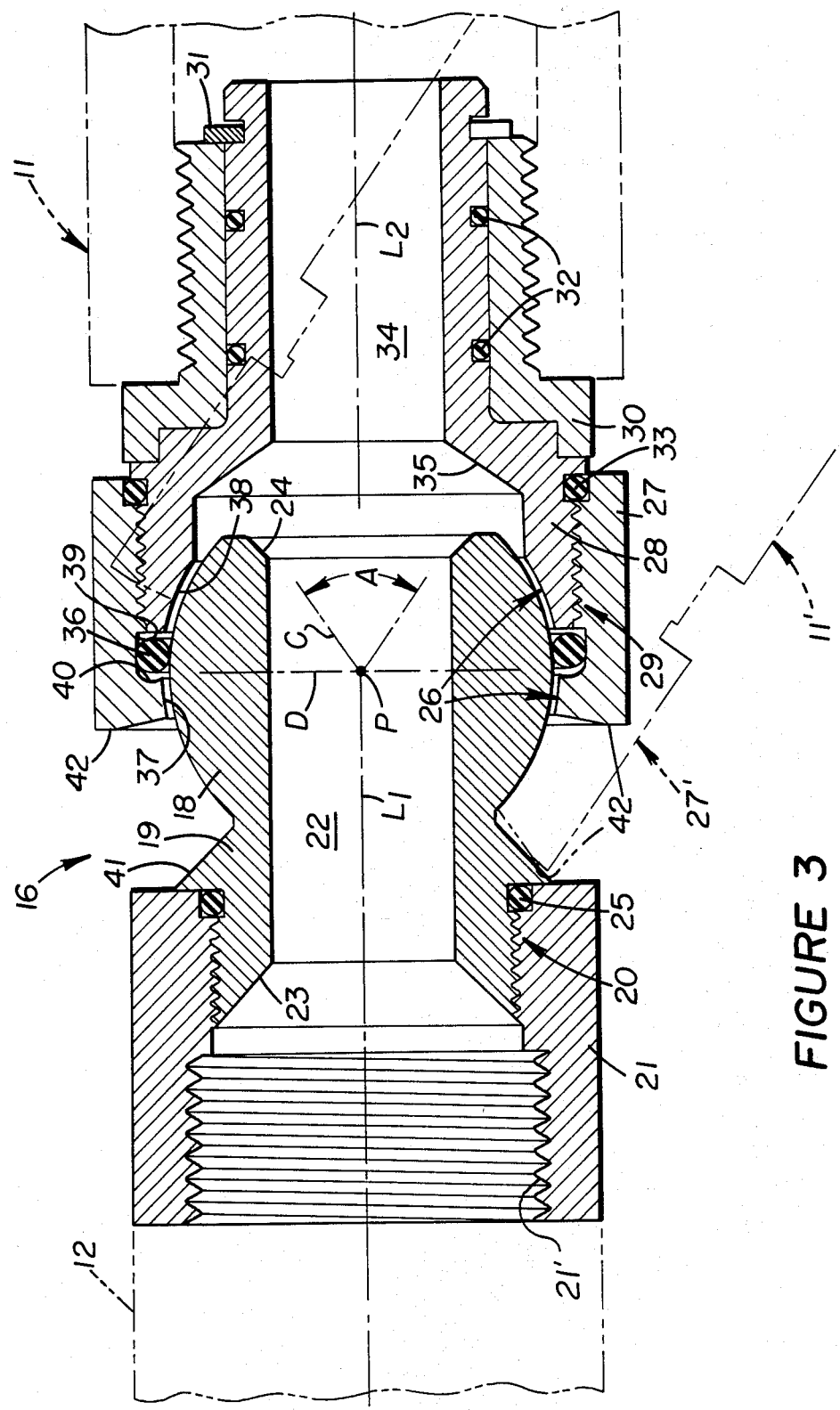
FIG. 3 is an enlarged sectional view through a swivel connection between the fuel hose and the dispensing nozzle, taken generally in the direction of arrows III—III in FIG. 2.

FIG. 1 illustrates a fuel dispensing apparatus 10 of the vapor recovery type comprising a fuel dispensing nozzle 11 connected to a fuel hose 12 and to a vapor recovery hose 13. As is well known in the art, the nozzle includes an annular elastomeric face seal 14 adapted for sealing engagement on the mouth of a neck or fill spout of a fuel tank of a vehicle for fuel dispensing purposes, through a dispensing spout 15. During dispensing of the fuel, such as gasoline, vapors are recovered and communicated back to the station's gasoline storage tank or other vapor recovery system via vapor recovery hose 13 in a conventional manner. During the fuel dispensing operation, it is important for vapor recovery systems of the balance type that seal 14 be maintained in tight sealing contact on the entry mouth to the fuel tank to prevent the vapors from escaping to ambient. Since the nozzle's detailed construction and operation are well known to those skilled in the art, further detailed explanation thereof is unnecessary for a full understanding of applicant's invention.

One of the problems confronting a user of a conventional vapor recovery nozzle resides in the rigid attachment of the nozzle to the fuel and vapor recovery hoses. In particular, the nozzles are difficult to use and subject the hoses to torsional and bending stresses which induce premature failure of the hoses. As discussed above, the utilization of a pair of unidirectional swivel joints between the hoses and nozzle gives rise to other problems, including limited relative movement between the nozzle and hoses and a restricted flow of vapor from the fuel tank to the vapor recovery hose.

This invention overcomes these problems by providing a universal coupling means 16 between each fuel hose 12 and vapor recovery hose 13 and nozzle 11 to permit the nozzle to swivel, whereby the user is enabled to easily engage seal 14 of the nozzle in full sealing contact on the entry mouth to a vehicle's fuel tank. As stated above, coupling means 16 can be also utilized to connect a single fuel hose to a fuel nozzle of the non-vapor recovery type.

Referring to FIG. 3, each universal coupling means 16 and 17 preferably comprises a ball and socket type swivel connection adapted to permit nozzle 11 to swivel about a pivot point P within an imaginary conical plane C having its vertex at the pivot point. As shown, the imaginary conical plane is in the form of a right circular cone (cone of revolution) having an included angle A, when viewed as a triangle in longitudinal cross-section through the conical plane, of at least 40°. In the preferred commercial embodiment of this invention, the included angle preferably approximates 70°.

The ball and socket swivel connection includes a spherical ball 18 having a neck 19 threadably connected at 20 to an internally threaded collar 21. The collar is internally threaded at 21' for suitable connection to hose 12 in a conventional manner. A cylindrical passage 22 is formed centrally through ball 18 and its neck 19 and is disposed on a longitudinal axis $L_1$ thereof.

In the dispensing of fuel, the fuel passage terminates at its upstream end at a frustoconically-shaped inlet 23 and at its downstream end at a frustoconically-shaped outlet 24. As will become apparent, the flared inlet and outlet aid in ensuring substantially unrestricted and streamlined flow of fuel during the fuel dispensing operation. An O-ring seal 25 is suitably mounted in recesses defined in neck 19 and collar 21 to form a static seal thereat, preventing fuel leakage.

As further shown in FIG. 3, ball 18 is universally mounted in a socket 26, partially defined in a retaining ring 27 and further defined in an elongated sleeve 28. The retaining ring is threadably mounted on the sleeve at a threaded connection 29 and an adapter sleeve 30 is slidably mounted on sleeve 28 and retained thereon by a retaining ring 31. A pair of O-ring seals 32 are mounted between sleeves 28 and 30, whereas a single O-ring seal 33 is suitably mounted between a downstream end of retaining ring 27 and sleeve 28.

Sleeve 28 has a cylindrical passage 34 formed therethrough on a longitudinal center line $L_2$ of the sleeve which is normally aligned to be co-linear with axis $L_1$ of fuel passage 22. Fuel passage 34 preferably has an internal diameter slightly less than that of fuel passage 22 and terminates at its upstream end at a frustoconical inlet 35 which faces outlet 24 and has a wider mouth. Fuel passages 22 and 34 and flared outlet 24 and inlet 35 are constructed and arranged to provide substantially unrestricted and maximum fuel flow therethrough when nozzle 11 is pivoted to any of its infinite positions within imaginary conical plane C.

Maximum pivotal movement of the nozzle and unrestricted and maximum fuel flow is further aided by the construction and arrangement of socket 26 and an associated O-ring seal 36. The socket comprises a first spherical segment 37 formed internally on retaining ring 27 and a second spherical segment 38 formed internally on sleeve 28. It should be noted in FIG. 3 that spherical segment 38 is normally positioned (when axes $L_1$ and $L_2$ are aligned as shown in FIG. 3) on a downstream side of pivot point P, whereas spherical segment 37 is positioned on an upstream side thereof. Otherwise stated, segment 37 is disposed on the upstream side of a diametrical plane D that intersects pivot point P and that is disposed in perpendicular relationship relative to co-linear longitudinal axes $L_1$ and $L_2$, whereas segment 38 is disposed on a downstream side of the plane. This arrangement facilitates the locking-in of socket 26 about ball 18 and substantially shorter segment 37 further ensures maximum pivotal or swivel movement of the nozzle between its positions 11 and 11' in all directions.

Segments 37 and 38 are interrupted by an annular groove 39, defined between retaining ring 27 and sleeve 28, which retains and positions O-ring seal 36 therein primarily on a downstream side of plane D and pivot point P when axes $L_1$ and $L_2$ are co-linear. The groove is preferably constructed to be slightly wider than the compressed seal to compensate for any potential swelling of the seal. The seal is preferably compressed a minimum amount to minimize seal wear, but yet provide the sealing desiderata.

In order to compensate for potential leakage past the seal due to wear thereof, an upstream end wall 40 of groove 39 is preferably formed with an arcuate cross-section to closely conform to the compressed shape of the seal. The seal is thus enabled to circumferentially contact the periphery of ball 18, closely adjacent to diametrical plane D, with the plane intersecting pivot point P and being at least closely adjacent to and in general alignment with arcuate end wall 40. Thus, when wear occurs in the spherical joint, seal 36 will remain closely adjacent to diametrical center plane D of the ball to continuously exhibit its sealing function. The arcuate length of spherical segment 37 is constructed sufficiently short to permit maximum pivoting movement of the nozzle through angle A (preferably approximately 70°) and yet provide sufficient structural integrity to the joint to prevent structural failure thereat.

Neck 19 of ball 18 has a frustoconical or flared bearing shoulder 41 formed thereon, that is adapted to engage a bearing shoulder 42 formed on an upstream end of retaining ring 27. As shown by the phantom-lined position 27' of the retaining ring in FIG. 3, maximum pivotal movement of nozzle 11 to coincide axis $L_2$ with the outer surface of imaginary conical plane C will cause bearing shoulders 41 and 42 to engage each other to thus provide stop means for delimiting further pivotal movement of the nozzle relative to the fuel hose.

The positioning of these bearing shoulders substantially radially outwardly and longitudinally away from pivot point P will aid in preventing the imposition of undue stresses on ball 18 and its attendant joint structures when the nozzle is pivoted a maximum amount. This arrangement further enables fuel passage 22 to have a relatively large inner diameter for substantially unrestricted and maximum fuel flow therethrough. As discussed above, upon maximum pivotal movement of nozzle 11 on ball 18, the disposition of flared outlet 24 of fuel passage 22 and its cooperation with flared inlet 35 of fuel passage 34 will ensure such unrestricted and maximum fuel flow therethrough.

It should be understood that various changes can be made to this invention by those skilled in the arts relating hereto, without departing from the spirit of the invention. For example, ball 18 and socket 26 could be reversed, i.e., the ball attached to the nozzle and the socket attached to the hose.

Other aspects, objects, and advantages of this invention can be obtained from a study of the drawings, the description, and the appended claims.

I claim:

1. In a fuel dispensing apparatus having a fuel dispensing nozzle and a flexible fuel dispensing hose, adapted for connection to a standard fuel pump at a service station, communicating with said nozzle, the improvement comprising a separate swivel connection releasably attached between said nozzle and said flexible fuel dispensing hose, including universal coupling means for permitting said nozzle to swivel universally relative to said hose about a single pivot point within and forming an imaginary conical surface of a cone having its vertex at said pivot point, the included angle of said conical surface being substantially greater than 20° when viewed as a triangle in longitudinal cross section through said conical surface, said universal coupling means comprises a ball and socket swivel connection.

2. The fuel dispensing apparatus of claim 1 wherein the included angle of said conical surface, when viewed as a triangle in longitudinal cross-section through said conical surface, is at least 40°.

3. The fuel dispensing apparatus of claim 2 wherein said angle appoximates 70°.

4. The fuel dispensing apparatus of claim 1 wherein said swivel connection further comprises a retaining ring having a first spherical segment of said socket formed therein and a sleeve attached to said retaining ring having a second spherical segment of said socket formed therein in alignment with said first spherical segment.

5. The fuel dispensing apparatus of claim 4 further comprising an externally threaded adapter sleeve rotatably mounted on said first-mentioned sleeve and having said nozzle threadably attached thereto.

6. The fuel dispensing apparatus of claim 4 further comprising an annular groove formed internally between said retaining ring and said sleeve and between said first and second spherical segments, and an elastomeric seal mounted in said groove and engaging said ball.

7. The fuel dispensing apparatus of claim 6 wherein said first spherical segment is disposed on a side of a diametrical plane intersecting said pivot point and disposed in perpendicular relationship relative to colinear longitudinal axes of said ball and said sleeve.

8. The fuel dispensing apparatus of claim 7 wherein said groove has an arcuate end wall formed on said retaining ring and positioned at least closely adjacent to said diametrical plane.

9. The fuel dispensing apparatus of claim 4 further comprising a first passage formed longitudinally through said ball and having a flared inlet facing upstream and a flared outlet facing downstream and a second passage formed longitudinally through said sleeve and having a flared inlet facing the outlet of said first passage.

10. The fuel dispensing apparatus of claim 9 wherein said first and second passages are each cylindrical and wherein the inlet to said second passage has a wider mouth than the outlet of said first passage.

11. The fuel dispensing apparatus of claim 4 further comprising stop means for delimiting pivotal movement of said nozzle relative to said hose.

12. The fuel dispensing apparatus of claim 11 wherein said stop means comprises a first annular bearing shoulder formed on a neck of said ball and disposed substantially radially outwardly and longitudinally away from said pivot point, and a second annular bearing shoulder formed radially outwardly on said retaining ring.

13. The fuel dispensing apparatus of claim 1 wherein a fuel hose and a separate vapor recovery hose are each attached to said nozzle by a said separate swivel connection.

14. A swivel connection adapted to attach a fuel dispensing nozzle to a hose comprising a ball,
means for attaching one of said nozzle and said hose to said ball,
a retaining ring,
a sleeve threadably attached to said retaining ring,
means for attaching the other one of said nozzle and said hose to said sleeve,
a socket defined internally on said retaining ring and said sleeve and universally mounting said retaining ring and said sleeve on said ball for universal swivel movements about a pivot point within and forming an imaginary conical surface of a cone having its vertex at said pivot point, said conical surface having an included angle greater than 40°, when viewed as a triangle in longitudinal cross section, and
an annular sealing means for forming a fluid seal between said ball and said socket.

15. The swivel connection of claim 14 further comprising an annular groove defined internally between said retaining ring and said sleeve, and wherein said sealing means comprises an annular elastomeric seal mounted in said groove and engaging said ball in sealing contact therewith.

16. The swivel connection of claim 15 wherein said retaining ring has a first spherical segment of said socket formed therein and said sleeve has a second spherical segment of said socket formed therein in alignment with said first spherical segment, said annular groove being formed internally between said retaining ring and said sleeve and between said first and second spherical segments.

17. The swivel connection of claim 16 wherein said first spherical segment is disposed on a side of a diametrical plane intersecting said pivot point and disposed in perpendicular relationship relative to co-linear longitudinal axes of said ball and said sleeve.

18. The swivel connection of claim 17 wherein said groove has an arcuate end wall formed on said retaining ring and positioned at least closely adjacent to said diametrical plane.

19. The swivel connection of claim 14 further comprising a first passage formed longitudinally through said ball and having a flared inlet facing upstream and a flared outlet facing downstream and a second passage formed longitudinally through said sleeve and having a flared inlet facing the outlet of said first passage.

20. The swivel connection of claim 20 wherein the first and second passages are each cylindrical and wherein the inlet to said second passage has a wider mouth than the outlet of said first passage.

21. The swivel connection of claim 14 further comprising stop means for delimiting pivotal movement of said retaining ring and said sleeve relative to said ball.

22. The swivel connection of claim 21 wherein said stop means comprises a first annular bearing shoulder formed on a neck of said ball and disposed substantially radially outwardly and longitudinally away from said pivot point, and a second annular bearing shoulder formed radially outwardly on said retaining ring.

* * * * *

UNITED STATES PATENT AND TRADEMARK OFFICE
CERTIFICATE OF CORRECTION

PATENT NO. : 4,776,615
DATED : OCTOBER 11, 1988
INVENTOR(S) : RANDAL K. YOUNG

It is certified that error appears in the above-identified patent and that said Letters Patent is hereby corrected as shown below:

Title page:

Inventor name, please change "Randall" to --Randal--.

Signed and Sealed this

Eighteenth Day of April, 1989

Attest:

DONALD J. QUIGG

*Attesting Officer*  *Commissioner of Patents and Trademarks*